(12) United States Patent
Copeland

(10) Patent No.: US 11,873,191 B2
(45) Date of Patent: Jan. 16, 2024

(54) ELEVATOR PROPULSION DEVICE INCLUDING A POWER SUPPLY ARRANGED TO REDUCE NOISE IN THE CAB

(71) Applicant: OTIS ELEVATOR COMPANY, Farmington, CT (US)

(72) Inventor: George Scott Copeland, Wethersfield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 370 days.

(21) Appl. No.: 17/007,229

(22) Filed: Aug. 31, 2020

(65) Prior Publication Data

US 2022/0063961 A1 Mar. 3, 2022

(51) Int. Cl.
| | |
|---|---|
| *B66B 11/04* | (2006.01) |
| *H01M 50/20* | (2021.01) |
| *B66B 11/02* | (2006.01) |
| *G10K 11/168* | (2006.01) |
| *B66B 9/02* | (2006.01) |

(52) U.S. Cl.
CPC ........ *B66B 11/043* (2013.01); *B66B 11/0226* (2013.01); *G10K 11/168* (2013.01); *H01M 50/20* (2021.01); *B66B 9/02* (2013.01); *H01M 2220/20* (2013.01)

(58) Field of Classification Search
CPC . B66B 11/043; B66B 11/0226; B66B 11/005; B66B 9/02; H01M 50/204; H01M 2220/20; G01K 11/168
See application file for complete search history.

(56) References Cited

U.S. PATENT DOCUMENTS

| | | | |
|---|---|---|---|
| 5,464,072 A * | 11/1995 | Muller | B66B 9/02 |
| | | | 182/12 |
| 2010/0187045 A1* | 7/2010 | Ishikawa | B66B 1/34 |
| | | | 187/290 |
| 2013/0233652 A1* | 9/2013 | Ghazi | B66B 11/0045 |
| | | | 187/290 |
| 2017/0260026 A1* | 9/2017 | Dominguez | B66B 11/0246 |
| 2017/0275138 A1* | 9/2017 | Fauconnet | B66B 1/30 |
| 2020/0234686 A1* | 7/2020 | Hosoda | B32B 5/245 |
| 2021/0039349 A1* | 2/2021 | Gurvich | B29D 99/0021 |
| 2021/0375251 A1* | 12/2021 | Lee | B32B 5/022 |

FOREIGN PATENT DOCUMENTS

| | | | |
|---|---|---|---|
| JP | H06211466 A | * | 8/1994 |
| JP | 2002338175 A | * | 11/2002 |
| JP | 2010150037 A | * | 7/2010 |
| JP | 2011157202 A | * | 8/2011 |
| WO | 2016027120 A1 | | 2/2016 |

* cited by examiner

*Primary Examiner* — Michael R Mansen
*Assistant Examiner* — Michelle M Lantrip
(74) *Attorney, Agent, or Firm* — Carlson, Gaskey & Olds, P.C.

(57) ABSTRACT

An illustrative example embodiment of an elevator propulsion device includes at least one drive member configured to engage and climb along a vertical structure, a motor module including at least one motor configured to cause movement of the drive member and corresponding movement of an elevator cab, and a power supply including at least one energy source that is configured to provide power to the motor. The power supply is situated adjacent the motor module such that a mass of the at least one energy source provides a noise barrier to reduce transmission of noise from the motor into the elevator cab.

20 Claims, 1 Drawing Sheet

ELEVATOR PROPULSION DEVICE INCLUDING A POWER SUPPLY ARRANGED TO REDUCE NOISE IN THE CAB

BACKGROUND

Elevator systems typically include a cab for carrying passengers between various levels within a building. Many elevators include a machine that is situated in a stationary location, such as in a machine room that is distinct from the hoistway. Some modern elevator systems include the machine within the hoistway to eliminate the space required for a machine room. More recently, self-propelled climbing elevators have been proposed. The motor or mechanism for moving the elevator car is supported for vertical movement with the elevator car. Eliminating the machine room increased the potential for elevator system noises to be heard in the cab. Self-propelled elevator cars may further increase the likelihood of machine noise being heard in the cab.

SUMMARY

An illustrative example embodiment of an elevator propulsion device includes at least one drive member configured to engage and climb along a vertical structure, a motor module including at least one motor configured to cause movement of the drive member and corresponding movement of an elevator cab, and a power supply including at least one energy source that is configured to provide power to the motor. The power supply is situated adjacent the motor module such that a mass of the at least one energy source provides a noise barrier to reduce transmission of noise from the motor into the elevator cab.

In an example embodiment having at least one feature of the elevator propulsion device of the previous paragraph, the power supply includes a plurality of energy sources and at least some of the energy sources are arranged as a first noise barrier layer between one side of the motor module and the elevator cab.

In an example embodiment having at least one feature of the elevator propulsion device of any of the previous paragraphs, others of the energy sources are arranged as a second noise barrier layer that is situated along another side of the motor module.

In an example embodiment having at least one feature of the elevator propulsion device of any of the previous paragraphs, the motor module includes a plurality of sides, one of the sides of the motor module faces away from the elevator cab, and the plurality of energy sources collectively establish a noise barrier surrounding all but the one of the sides of the motor module.

In an example embodiment having at least one feature of the elevator propulsion device of any of the previous paragraphs, the power supply comprises at least one support panel that supports the at least one energy source in a selected position relative to the motor module.

In an example embodiment having at least one feature of the elevator propulsion device of any of the previous paragraphs, the at least one support panel comprises a first layer of a first material and a second layer of a second material, and the first material is more rigid than the second material.

In an example embodiment having at least one feature of the elevator propulsion device of any of the previous paragraphs, the at least one support panel comprises a third layer, the second layer is between the first layer and the third layer, and the third layer comprises the first material.

In an example embodiment having at least one feature of the elevator propulsion device of any of the previous paragraphs, the first material comprises metal and the second material is one of organic or a polymer.

In an example embodiment having at least one feature of the elevator propulsion device of any of the previous paragraphs, the power supply comprises a housing including the at least one support panel, and the housing generally surrounds the at least one energy source.

In an example embodiment having at least one feature of the elevator propulsion device of any of the previous paragraphs, the housing includes a plurality of sidewalls that collectively define a space and at least a portion of the motor module that produces noise is situated in the space.

In an example embodiment having at least one feature of the elevator propulsion device of any of the previous paragraphs, the housing surrounds the entire motor module and the at least one energy source.

In an example embodiment having at least one feature of the elevator propulsion device of any of the previous paragraphs, the at least one energy source comprises at least one battery.

In an example embodiment having at least one feature of the elevator propulsion device of any of the previous paragraphs, the at least one energy source comprises a plurality of batteries.

An illustrative example embodiment of an elevator car, includes the elevator propulsion device of any of the previous paragraphs and an elevator cab having one side facing the motor module.

In an example embodiment having at least one feature of the elevator car of the previous paragraph, the elevator cab includes a floor having a floor area, the power supply includes a plurality of energy sources that are arranged parallel with the floor, and the plurality of energy sources cover an area that is coextensive with the floor area.

In an example embodiment having at least one feature of the elevator car of either of the previous paragraphs, the energy sources are situated beneath the cab.

An illustrative example embodiment of a method of reducing noise transmission from a motor module of an elevator propulsion device into an elevator cab, includes situating a power supply between the motor module and the elevator cab such that a mass of at least one energy source of the power supply serves as a noise barrier between the motor module and the elevator cab.

In an example embodiment having at least one feature of the method of the previous paragraph, the at least one energy source a plurality of energy sources and the method comprises arranging the plurality of energy sources to generally surround at least a portion of the motor module that generates noise.

In an example embodiment having at least one feature of the method of any of the previous paragraphs, the at least one energy source comprises at least one battery.

In an example embodiment having at least one feature of the method of any of the previous paragraphs, the elevator cab includes a floor having a floor area, the power supply includes a plurality of energy sources that are arranged parallel with the floor, and the plurality of energy sources cover an area that is coextensive with the floor area.

The various features and advantages of at least one disclosed example embodiment will become apparent to those skilled in the art from the following detailed description. The drawings that accompany the detailed description can be briefly described as follows.

DETAILED DESCRIPTION

Figure 1:
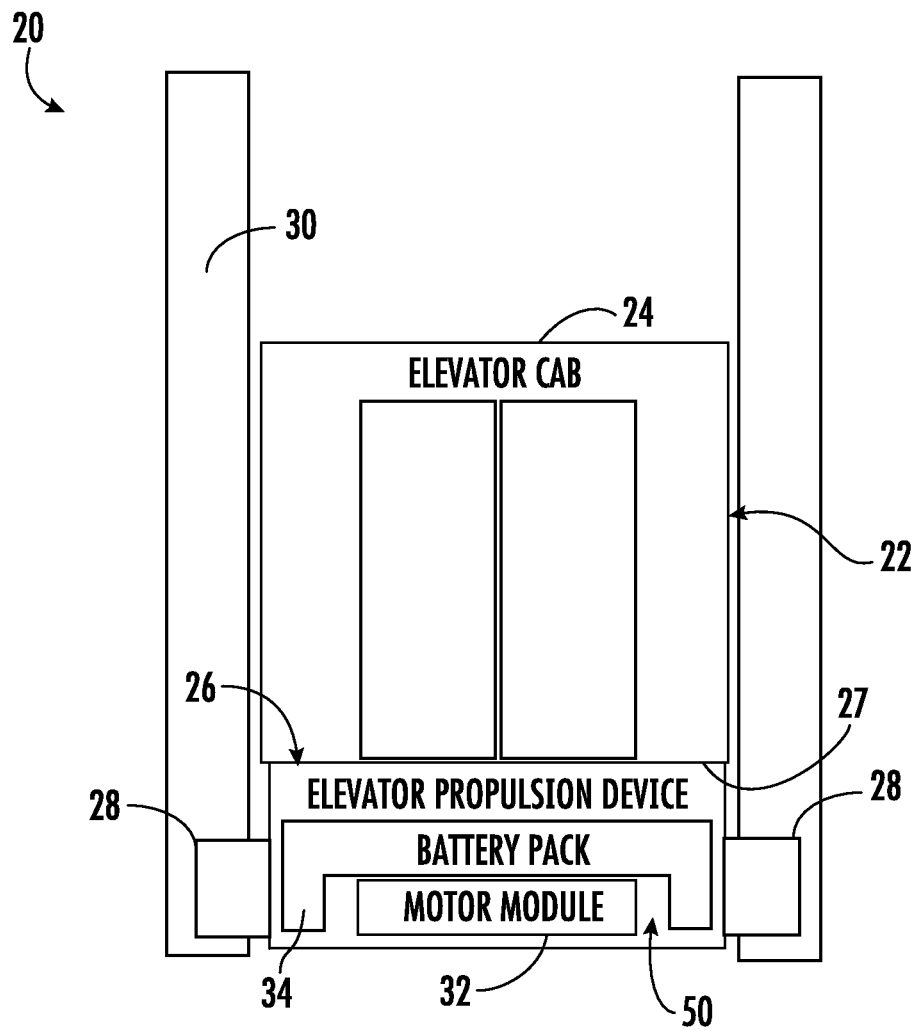
FIG. 1 schematically illustrates selected portions of an example embodiment of an elevator system including a power supply that reduces noise transmission into an elevator cab.

FIG. 1 diagrammatically illustrates selected portions of an elevator system 20. An elevator car 22 includes an elevator cab 24. An elevator propulsion device 26 is associated with or part of the elevator car 22. The elevator propulsion device 26 includes a at least one side 27 that faces toward the elevator cab 24. The elevator propulsion device 26 includes at least one drive member 28 that is configured to climb along a vertical structure 30 to selectively move the elevator car 22. In some embodiments, each drive member 28 includes a wheel that rolls along a surface of the vertical structure 30, which may comprise an I-beam, for example.

A motor module 32 includes at least one motor that causes movement of the drive member 28. A power supply 34 includes at least one energy source configured to provide power to the motor module 32. The power supply 34 is at least partially situated between the motor module 32 and the side 27 of the elevator propulsion device 26 where the mass of the at least one energy source of the power supply 34 provides a noise barrier to reduce noise transmission from the motor module 32 into the elevator cab 24. Noise generated by the motor module 32 could be heard by a passenger in the elevator cab 24 because of the close proximity of the motor module 32 to the elevator cab 24. The power supply 34 provides a barrier to reduce such noise transmission.

Figure 2:
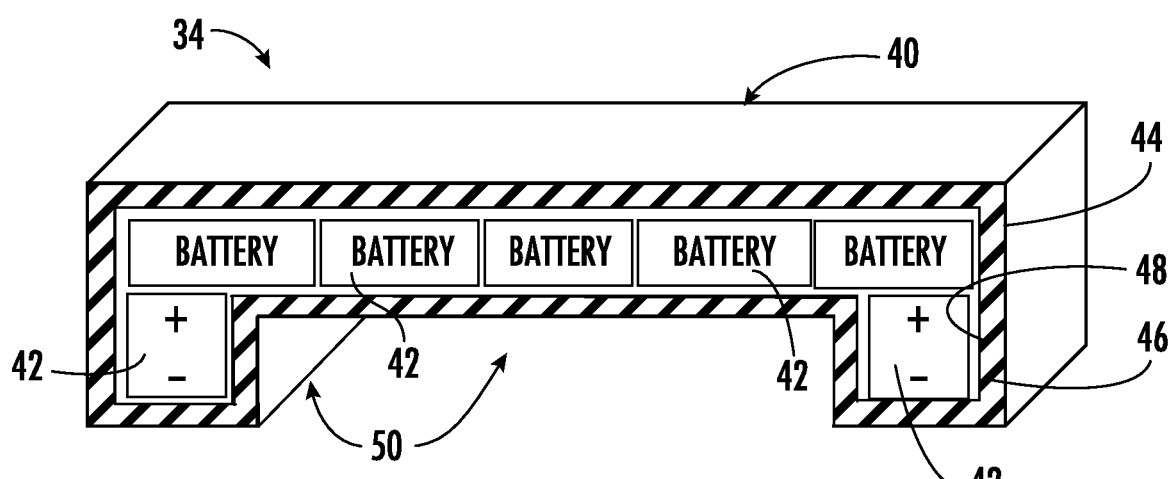
FIG. 2 schematically illustrates selected features of an example battery pack configuration.

FIG. 2 shows an example configuration of the power supply 34. A housing 40 supports a plurality of energy sources 42 in an arrangement that provides an effective noise barrier. The housing 40 includes panels having a first layer 44 that establishes an exterior of the housing 40, a second layer 46 adjacent the first layer 44, and a third layer 48 that establishes an interior of the housing 40. Some embodiments include a single layer, such as the first layer 44, or two layers instead of three. Some embodiments may include more than three layers.

The first layer 44 and the third layer 48 may be more rigid than the second layer 46. The first layer 44 and the third layer 48 in this example comprise the same material, such as metal. The second layer 46 comprises a different material that has sound-insulating qualities. For example, the first layer 44 and the third layer 48 are aluminum and the second layer 46 is rubber. In some embodiments, the second layer 46 comprises a foam or batting, either of which may comprise a polymer or an organic material. Laminated structural panels that have sound-insulating properties are commercially available and some embodiments of the housing 40 are made of such panels.

The example housing 40 defines a space 50 that is configured to receive at least the portion of the motor module 32 that generates noise, such as the motor or motors. The energy sources 42 are arranged to generally surround the space 50. In the illustrated embodiment, the energy sources 42 are situated to surround all but one side of the motor module 32 (the bottom in the drawings) that faces away from the elevator cab 24. Such an arrangement takes advantage of the mass of the energy sources to insulate the elevator cab 24 from noises associated with operation of the motor module 32. In one embodiment, the energy sources 42 may simply be between the motor module 32 and the elevator cab 24 and may or may not be on one or more sides of the motor module 32.

Some of the energy sources in this example are arranged in a first layer that is parallel to the side 27 of the propulsion device 26. Those energy sources are arranged to cover an area that is coextensive with an area of the floor of the elevator cab 24 in some embodiments. In the illustrated embodiment, those energy sources are situated above a top of the motor module 32. Others of the energy sources 42 are arranged in a second layer that situated along sides of the motor module 32.

The power supply 34 can be configured to accommodate the shape and size of the motor module 32 while providing a noise barrier. In some embodiments, the housing 40 comprises a single support panel to which the energy sources 42 are mounted.

Various energy sources may be used in different embodiments. For example, the energy sources 42 may be energy storing devices such as batteries or capacitors or energy generating devices such as fuel cells. The illustrated example embodiment includes batteries as the energy sources 42. Batteries serve as an effective noise barrier, in part, because of their mass. Using the mass of the batteries of the power supply 34 as a sound barrier provides an effective way to prevent noise transmission into the elevator cab 22 without requiring additional noise insulating material. Using the batteries, or other energy sources 42, which are required to power the motor module 32, as a noise barrier saves space and reduces cost that additional noise-reducing material would otherwise require.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator propulsion device, comprising:
   at least one drive member configured to engage and climb along a rigid, stationary vertical structure,
   a motor module including at least one motor configured to cause movement of the at least one drive member and corresponding movement of an elevator cab, and
   a power supply including at least one energy source that is configured to provide power to the at least one motor, wherein the power supply surrounds a plurality of sides of the motor module such that a mass of the at least one energy source provides a noise barrier to reduce transmission of noise from the at least one motor into the elevator cab.

2. The elevator propulsion device of claim 1, wherein the plurality of sides of the motor module includes at least a first side and a second side that is transverse to the first side, and wherein the at least one energy source comprises a plurality of energy sources and wherein at least some energy sources of the plurality of energy sources are arranged as a first noise barrier layer between the first side of the motor module and the elevator cab, and other energy sources of the plurality of energy sources are arranged along the second side of the motor module as a second noise barrier layer.

3. The elevator propulsion device of claim 1, wherein the at least one energy source comprises a plurality of energy sources, and wherein the plurality of sides of the motor module includes at least a top wall and opposing side walls that extend downwardly from the top wall, and wherein at least some energy sources of the plurality of energy sources are arranged as a first noise barrier layer between the top wall of the motor module and the elevator cab, and wherein other energy sources of the plurality of energy sources are arranged as a second noise barrier layer that is situated below the first noise barrier layer and extends along the opposing side walls of the motor module.

4. The elevator propulsion device of claim 3, wherein the plurality of sides of the motor module further includes bottom wall that faces away from the elevator cab, the bottom wall being connected to the top wall by the opposing side walls, and the plurality of energy sources collectively establish a noise barrier surrounding all but the bottom wall of the motor module.

5. The elevator propulsion device of claim 1, wherein the power supply comprises at least one support panel to which the at least one energy source is mounted in a selected position relative to the motor module.

6. The elevator propulsion device of claim 5, wherein the at least one support panel comprises a first layer of a first material and a second layer of a second material, and the first material is more rigid than the second material.

7. The elevator propulsion device of claim 6, wherein the at least one support panel comprises a third layer, the second layer is between the first layer and the third layer, and the third layer comprises the first material.

8. The elevator propulsion device of claim 7, wherein the first material comprises metal and the second material is one of organic or a polymer.

9. The elevator propulsion device of claim 5, wherein the power supply comprises a housing including the at least one support panel, and the housing generally surrounds the at least one energy source.

10. The elevator propulsion device of claim 9, wherein the plurality of sides of the motor module includes at least a first side and a second side that is transverse to the first side, and wherein the first side of the motor module comprises a top wall of the motor module, and wherein the housing includes a plurality of sidewalls that collectively define a space between an outer surface of a bottom wall of the plurality of sidewalls and an upper surface of the top wall of the motor module, and at least a portion of the motor module that produces noise is situated in the space.

11. The elevator propulsion device of claim 9, wherein the housing surrounds the at least one energy source in its entirety, and wherein an outermost bottom surface of the housing includes a recessed space that receives at least a portion of the motor module.

12. The elevator propulsion device of claim 1, wherein the at least one energy source comprises at least one battery.

13. The elevator propulsion device of claim 12, wherein the at least one battery comprises a plurality of batteries.

14. An elevator car, comprising the elevator propulsion device of claim 1 and wherein the elevator cab has one side facing the motor module.

15. The elevator car of claim 14, wherein the elevator cab includes a floor having a floor area, and the at least one energy source includes a plurality of energy sources that are arranged parallel with the floor.

16. The elevator car of claim 14, wherein the at least one energy source is situated beneath the elevator cab.

17. An elevator propulsion device, comprising:
at least one drive member configured to engage and climb along a vertical structure;
a motor module including at least one motor configured to cause movement of the drive member and corresponding movement of an elevator cab, the motor module having a top and a plurality of sides that are transverse to the top and extend below the top; and
a power supply including at least one energy source that is configured to provide power to the motor, wherein the power supply is situated adjacent the motor module such that a mass of the at least one energy source provides a noise barrier to reduce transmission of noise from the motor into the elevator cab, the power supply including a plurality of energy sources, at least some of the energy sources being arranged as a first noise barrier layer between the top of the motor module and the elevator cab, at least some others of the energy sources being arranged as a second noise barrier layer situated below the first noise barrier layer, the at least some others of the energy sources being situated adjacent the plurality of sides of the motor module such that the motor module is at least partially tucked into a recessed space defined by the first noise barrier layer and the second noise barrier layer.

18. The elevator propulsion device of claim 17, wherein the power supply comprises at least one support panel that supports the at least one energy source in a selected position relative to the motor module,
the at least one support panel comprises a first layer of a first material and a second layer of a second material, and
the first material is more rigid than the second material.

19. The elevator propulsion device of claim 18, wherein the at least one support panel comprises a third layer, the second layer is between the first layer and the third layer, and the third layer comprises the first material.

20. The elevator propulsion device of claim 19, wherein the first material comprises metal and the second material is one of organic or a polymer.

* * * * *